J. C. DEMBICZAK.
AUTOMOBILE SIGNAL.
APPLICATION FILED MAY 15, 1918.
1,323,353.  Patented Dec. 2, 1919.
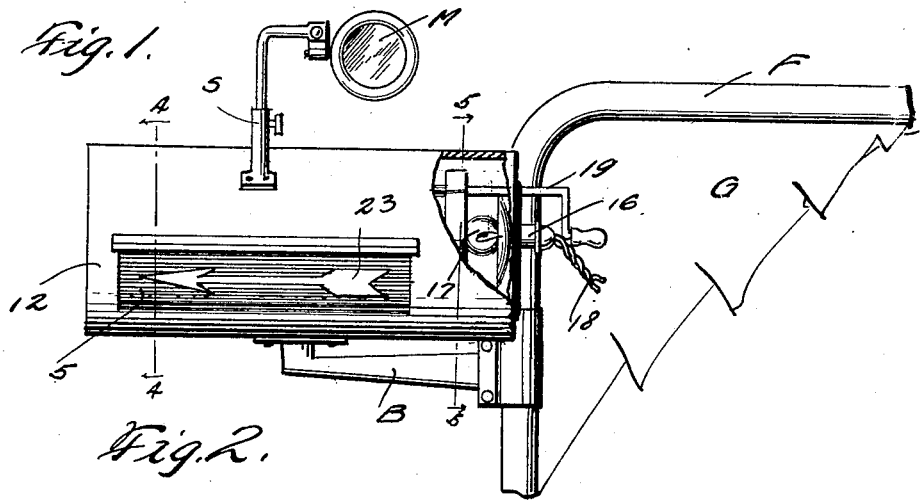
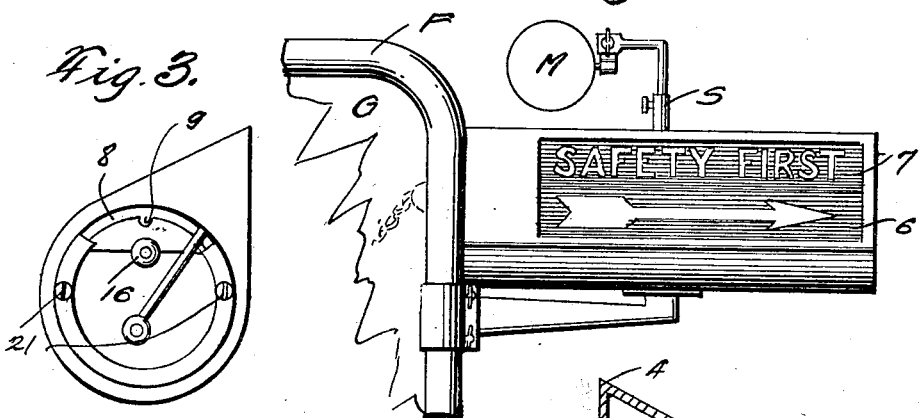
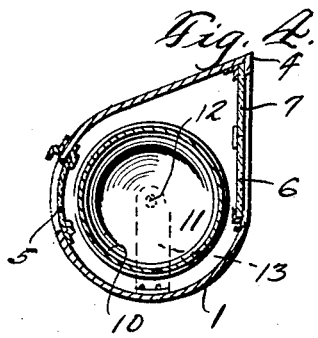
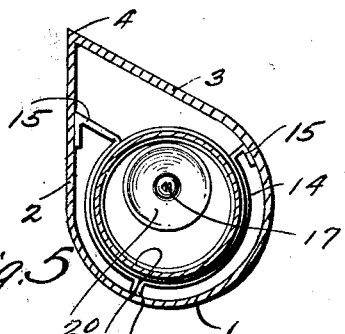
INVENTOR
John. C. Dembiczak
BY *Richard Owen*
ATTORNEY
WITNESSES

UNITED STATES PATENT OFFICE.

JOHN C. DEMBICZAK, OF POLONIA, WISCONSIN.

AUTOMOBILE-SIGNAL.

1,323,353.  Specification of Letters Patent.  Patented Dec. 2, 1919.

Application filed May 15, 1918. Serial No. 234,694.

*To all whom it may concern:*

Be it known that I, JOHN C. DEMBICZAK, a citizen of the United States, residing at Polonia, in the county of Portage and State of Wisconsin, have invented certain new and useful Improvements in Automobile-Signals, of which the following is a specification.

This invention relates to changeable exhibitors, and more especially to illuminated lamp boxes; and the object of the same is to produce a signal especially adapted for use on automobiles and in which a single small electric bulb will give warning to those both in front and in rear of the driver of his intention to turn in either direction, and will constantly illuminate a legend such as "Safety first" which forms a transparency in the front wall of the lamp box.

A further object is to produce a sign of this kind in which the movable element is operable readily by the operator's disengaged hand, thus avoiding the necessity for complicated operating mechanism.

Other objects will appear from the following specification and claims, and reference is made to the drawings, wherein:—

Figure 1 is a rear elevation and Fig. 2 a front elevation of this device as applied to the left-hand end of the frame of a windshield, assuming that it is mounted on an automobile having a left-hand drive, Fig. 3 is an end elevation of the inner end of the lamp box, Figs. 4 and 5 are sectional views on the lines 4—4 and 5—5 of Fig. 1.

Of the windshield in the present case we need illustrate only a portion of the glass G and of the frame F. A suitable bracket B clamped on the latter carries the lamp box yet to be described, and the top of the box itself may carry a standard for supporting mirror, these elements being indicated by the letters S and M. As we sit in the driver's seat in a car having a left-hand drive, we look at the rear of the signal and the entire structure appears about as seen in Fig. 1. As the automobile approaches us, assuming that we are in another machine or on the street in front of the automobile, the signal appears about as shown in Fig. 2.

Coming now to the details of the present invention the numeral 1 designates the principal portion of the lamp box casing, which as seen in Figs. 3, 4, and 5, is substantially cylindrical throughout most of its wall, but its front face 2 is flat and its top 3 is carried forward and upward from the rear wall to an angle at 4. The rear wall has a plain glass panel 5. The front wall has a plain glass panel 6, and directly above it a red glass panel 7 on which may be inscribed a legend such as the words "Safety first" or these words may be stenciled in a plate laid over the back of the red glass, or any appropriate means may be employed to disclose such words prominently and constantly, and especially to permit them to be illuminated after dark. It is not essential that the panels 6 and 7 be of different color, but I prefer that the uppermost shall be highly colored so as to attract attention. The outer end of the casing may be cut off flat as seen at the left of Fig. 1 and the right of Fig. 2, and its inner end, which may be removable to permit access to the interior, has an arcuate slot 8 provided at its mid-length with a notch 9 for a purpose yet to appear.

Disposed concentrically within the cylindrical portion of the casing above described is a rotary element or drum 10 whose details of structure are not essential excepting that I should prefer that its walls be translucent, as perhaps by being made of gelatin or white celluloid. Its outer end 11 may be closed and might well be of metal. This end is provided with a trunnion 12 journaled in a bearing 13 which may take the form of a bracket upstanding from the bottom of the casing as illustrated in dotted lines in Fig. 4. The inner end of the drum is surrounded by a metal band 14 as seen in Fig. 5, the same being attached at points 15 to the casing. Carried by said inner end of the casing, and preferably above and therefore eccentric to the drum as seen in Fig. 5, is a socket 16 of an electric lamp whose bulb 17 therefore stands above the projected axis of the drum, and some little distance inside its inner end, as seen where Fig. 1 is broken away, and the wires 18 lead from this socket and bulb to a suitable source of electric energy and are preferably provided with a switch so that the light can be turned on at night. Finally a rod 19 is secured to the drum at its inner end and projects through the slot 8 and carries a handle standing within reach of the operator when he sits on the driver's seat. The outer end 11 of the drum may have some reflective surface if desired, and a reflector 20 may surround the bulb 17 and be carried by its socket 16 at the inner side of the inner end of the casing. If said end be made removable, by means of screws 21 shown in Fig. 3, when it is taken off the entire lamp and reflector come off with it. Finally arrows 24 and 23 are inscribed upon or stenciled in the wall of the drum at appropriate points, two of them pointing in one direction and being diametrically opposite each other, and the other two pointing in the opposite direction and being also diametrically opposite each other mid-way between the first two. The purpose is to have one arrow displayed through the front panel 6 at the same time its companion is displayed through the rear panel 5, while the other two arows are then idle at top and bottom; but, when the drum is given a one-quarter revolution, the first two arrows pass to the top and bottom of the drum while the other arrows come into sight through the front and rear panels and the opposite indication is given. I speak of arrows, but any suitable indexes in the way of signals might be employed. It is obvious that when the lamp is lighted its rays shine into the interior of the drum and illuminate the indexes, whatever they are, and at the same time its rays shine past the inner end of the drum and illuminate the upper panel 7 which carries the legend "Safety first" as shown in Fig. 2. The notch 9 in the slot 8 may be employed for resting the rod 19 at what might be called a neutral point where neither pair of arrows is displayed. In that case the operator could swing the handle forward to indicate a turn in one direction, or rearward to indicate a turn in the other direction, and when he is proceeding straight ahead he could set the rod in the notch 9 and neither pair of arrows would be displayed. It will also be clear, without further illustration, that this device could be made in right and left. I have illustrated the bracket B as applied to the left edge of the frame F of the windshield, so that this device stands now within reach of the left hand of a driver whose right hand is on the steering wheel. This is for a left-hand drive automobile. Obviously the reverse would be the construction and position of parts for a right-hand drive automobile, but the operation would be exactly the same in all respects.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. A lamp box whose casing is of substantially cylindrical contour, transparent panels in the front and rear of said casing, a bearing at the axial center of the casing near the outer end thereof, a band carried by the casing concentric with its axis and near its inner end, a drum having a trunnion mounted in said bearing at its outer end and with its inner end rotatably mounted within said band, its wall being translucent and bearing signals adapted to be displayed through said panels, and means for setting said drum.

2. A lamp box whose casing is of substantially cylindrical contour, transparent panels in the said casing, a bearing at the axial center of the casing and near the outer end thereof, a band carried by the casing concentric with its axis and near its inner end, a drum having a trunnion mounted in said bearing at its outer end and with its inner end rotatably mounted within said band, its wall being translucent and bearing signals adapted to be displayed through said panels, the inner end of said casing having an arcuate slot concentric with the axis of the drum, a rod secured to the drum and projecting through said slot, and a lamp carried by said inner end and into the drum.

3. A lamp box whose casing is of cylindrical contour throughout most of its periphery with the exception of a flat front rising from the cylindrical portion and a roof rising to and joining the front at an angle, transparent panels in said casing, an additional panel above that in the front of the casing and bearing a warning legend, a bearing at the axial center of the cylindrical portion of said casing and near the outer end thereof, a band carried by the casing concentric with its axis and spaced from its inner end, a drum having a trunnion mounted in said bearing and with its open inner end rotatably mounted within said band, its wall being translucent and bearing signals adapted to be displayed through said panels, means for setting said drum to display the desired signal, a reflector carried by the inner end of said casing, and a lamp at the center of the reflector and above the axial line of said drum, projecting its rays both into the drum and into the space above it behind said warning legend.

In testimony whereof I affix my signature in presence of two witnesses.

JOHN C. DEMBICZAK.

Witnesses:
JOSEF LISS,
HENRY SCHLIESMANN.